J. HIGGINSON & H. ARUNDEL.
MACHINE FOR PRODUCING MILLING CUTTERS.
APPLICATION FILED NOV. 18, 1916.
1,268,007.
Patented May 28, 1918.
2 SHEETS—SHEET 1.
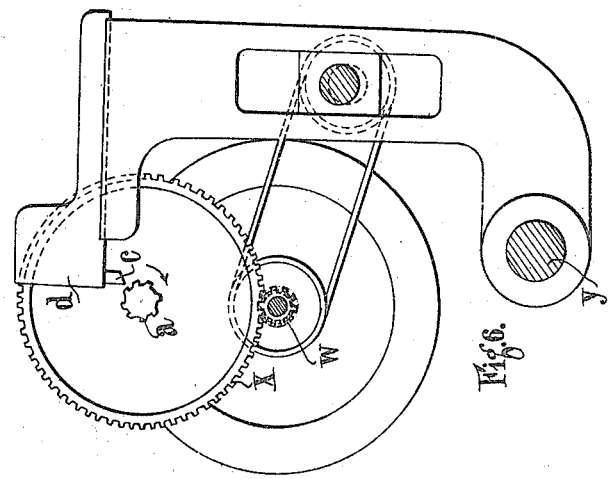
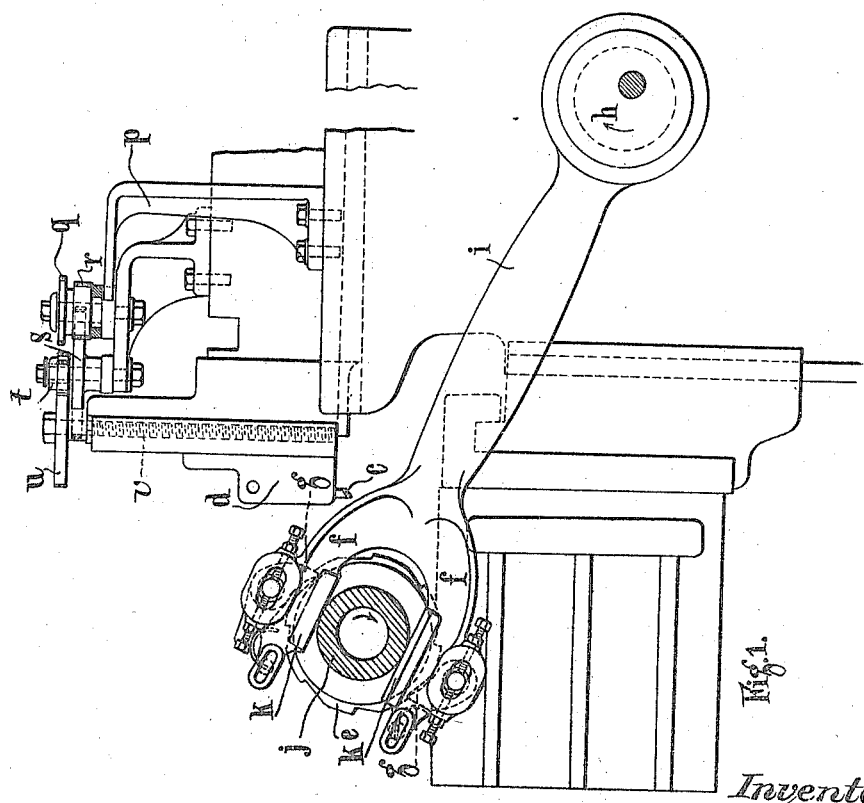
Inventors:
Joseph Higginson,
Hubert Arundel,
by Spear, Middleton, Donaldson & Spear
Attorneys.

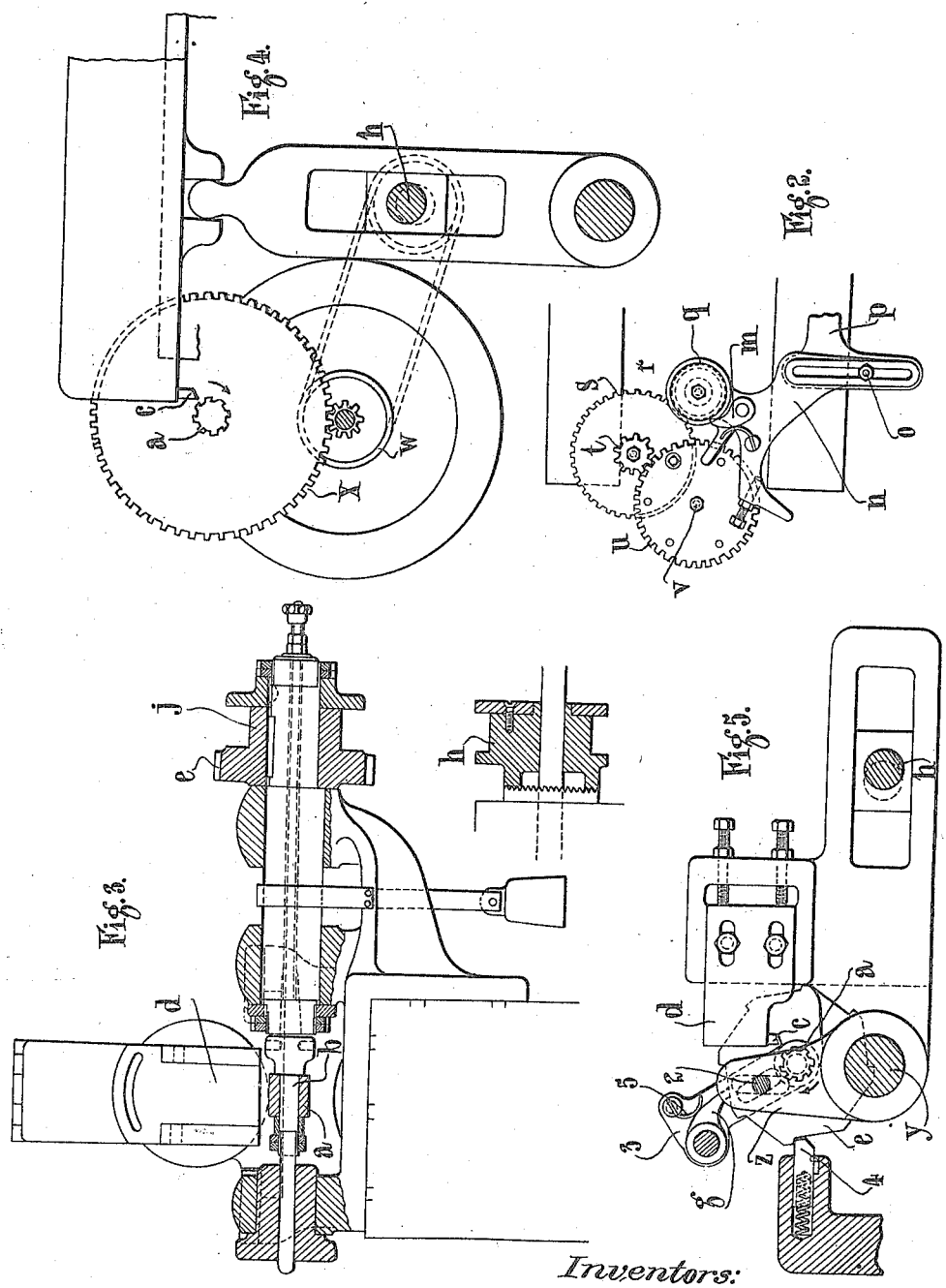

UNITED STATES PATENT OFFICE.

JOSEPH HIGGINSON AND HUBERT ARUNDEL, OF STOCKPORT, ENGLAND.

MACHINE FOR PRODUCING MILLING-CUTTERS.

1,268,007.   Specification of Letters Patent.   Patented May 28, 1918.

Application filed November 18, 1916. Serial No. 132,186.

*To all whom it may concern:*

Be it known that we, JOSEPH HIGGINSON and HUBERT ARUNDEL, subjects of the King of Great Britain and Ireland, and residents of Sovereign Works, Stockport, in the county of Chester, England, have invented certain new and useful Improvements in Machines for Producing Milling-Cutters, of which the following is a specification.

This invention relates to machines for producing milling cutters, and has for its object to provide a machine for the said purpose which shall be simple in design and capable of relatively rapid and economic production of the desired cutters.

Our invention comprises a machine in which, with a tool having a back and forth movement along the surface it is cutting, there is provided a circular movement of the work piece during the return or inoperative stroke of the tool, causing the work piece to follow up the tool as the latter is withdrawn, so that it meets another portion of the work piece on commencing its next forward or service stroke.

Our invention further comprises the arrangement whereby, in a machine as before specified, the work piece is given forward movement during both the cutting and return strokes of the tool, said movement being either a continuous movement or being interrupted at the end of each stroke of the tool.

Our invention further comprises the arrangement whereby, in a machine as before specified, the work piece is given a continuous rotary movement and the tool has an oscillatory movement through an arc of a circle.

Our invention further comprises the arrangement whereby, in a machine as above specified, the tool is oscillated through an arc of a circle and the work piece is held stationary during the cutting stroke of the tool and is advanced or follows up the tool during its return stroke.

Referring to the two accompanying sheets of explanatory drawings:—

Figure 1 is an elevation, partly in section, of a machine having our invention applied thereto in one convenient form.

Fig. 2 is a plan view of the tool feed gear of the machine shown in Fig. 1.

Fig. 3 is a part sectional end elevation through the work carrying spindle of the machine shown in Fig. 1.

Figs. 4, 5 and 6 are diagrammatic views illustrating three modified applications of our invention.

The same reference letters in the different views indicate the same or similar parts.

Referring in the first place to Figs. 1, 2 and 3, the work piece $a$ (Fig. 3) is mounted upon the spindle $b$ so that an imaginary vertical line passing through its axis always lies beyond or at the extreme limit of the forward traverse of the cutting tool $c$ in the holder $d$. We also mount a ratchet wheel $e$ upon the same axis as the work piece $a$ and provide two pawl carrying arms $f$ with their pawls $g$, $g'$ actuated from a cam or eccentric $h$ so that they move in unison with the cutting tool $c$. The connecting rod $i$ formed integrally with the pawl carrying arm $f$ is supported by a collar $j$ upon the ratchet wheel $e$, wearing blocks $k$ upon the arms $f$ riding upon such collar.

The said pawl carriers $f$ and pawls $g$ are so disposed that they give the work piece $a$ a rotary movement toward the cutting tool $c$ both when the latter is on its operative and its return strokes. On its service stroke, when it rotates the work piece, the upper pawl $g$ is preferably drawn away by the rod $i$ from an imaginary line passing through the axis of the work piece and at right angles to a line passing through the axes of the work piece $a$ and of the eccentric $h$ so that it imparts a negative acceleration to the work piece, the rate of such acceleration being increased by the variation in the angular position of the pawl due to movement about its own pivot. We thereby increase the amount of relief of the milling cutter teeth beyond what would be obtained if the work piece had a uniform movement.

The tool holder $d$ is fed toward the work by means of the gear train shown in Figs. 1 and 2. The pawl $m$ is carried by an arm $n$ on the tool slide, the said arm being rocked about the pin $o$ in the fixed bracket $p$ as the slide reciprocates. The ratchet wheel $q$ causes the rotation of the spur wheels $r$, $s$, $t$ and $u$, the latter being on the screw $v$ by which the tool holder is raised and lowered.

In the arrangement shown in Fig. 4, the cutting tool $c$ is reciprocated by the eccentric $h$, but the cutter being produced has a continuous rotary movement imparted thereto by a pinion $w$ and spur wheel $x$ or other gearing. The eccentric $h$ may be rotated by a chain or by spur or other gearing.

In the arrangement shown in Fig. 5, the tool holder $d$ is oscillated through an arc of a circle by the eccentric $h$, the said holder being carried in a frame or arm fulcrumed about the pin or the like $y$. A part $z$ of said frame or arm has a slot therein, into which enters a pin 2 on a pawl carrying arm 3 so that the pawl $g$ picks one tooth of the ratchet wheel $e$ for each forward movement of the tool holder $d$. A stop 4 serves as an abutment against which the ratchet wheel teeth can bear during the cutting operation. The pawl spring 5 is preferably sufficiently strong to tend to carry the ratchet wheel backward on its idle or return stroke, so as to insure that a tooth of said ratchet wheel is firm against the stop 4 before the cutter engages the work piece $a$.

The radius of movement of the tool is determined by the configuration of the milling cutter being produced.

With the Fig. 5 arrangement, the work piece is stationary during the operative strokes of the tool $c$ but follows up the latter on its idle or return stroke. Suitable tool feeding means may be provided for the tool $c$.

In the arrangement shown in Fig. 6, the tool $c$ is oscillated by the cam $h$ in the manner similar to that of the Fig. 5 arrangement, but the work piece $a$ has a continuous rotary movement as in the Fig. 4 arrangement. The rotary movements of the work piece and tool thus combine to produce the required contour of the teeth of the milling cutter.

We do not limit ourselves to any particular details of construction, but may modify the same within the scope of the appended claims.

It will be seen that the essential of our invention is that the cutting tool moves approximately in a plane which is nearly tangential to the peripheral edge of the work piece, the amount of the defection of said plane or approximate plane from a tangent being measured by the degree of backing-off which is to be imparted to the milling cutter teeth. It will also be seen that in all cases the cutting tool $c$ moves in a line forming an obtuse angle with the radial line of the cutter tooth under treatment. In previous practice, rack or bevel wheel teeth have been milled upon the side face of a blank by a cutter moving radially toward the center of the blank, but the latter cannot move simultaneously with the cutter on the return stroke of the cutter after cutting a tooth, for the cutter locks the blank against rotation.

Having now described our invention, what we claim as new, and desire to secure by Letters Patent is:—

1. A machine for the production of milling cutters by forming teeth around the peripheral edge of a work piece, comprising in combination a work piece with means for rotating the same, a cutting tool, means moving said cutting tool in a plane nearly tangential to the peripheral edge of the work piece, and means causing the work piece to follow up or move simultaneously with the cutting tool as the latter is being withdrawn after a cutting stroke, as set forth.

2. A machine for the production of milling cutters by forming teeth upon the peripheral edge of a work piece, comprising in combination a work piece with means for rotating the same, a cutting tool, a tool carrier, means moving said cutting tool in a line forming an obtuse angle with the radial line of the cutter tooth under treatment, and means causing the work piece to follow up or move simultaneously with the cutting tool as the latter is being withdrawn after a cutting stroke, as set forth.

3. In a machine for the production of milling cutters, the combination with a tool having a back and forth movement along the surface of and in a direction at right angles to the axis of the work piece it is cutting, of means imparting a circular movement to the said work piece during the cutting and return strokes of the tool, as set forth.

4. In a machine for the production of milling cutters, the combination with a tool having a back and forth movement along the surface of and in a direction at right angles to the axis of the work piece it is cutting, of means imparting to the said work piece circular movements synchronizing with the cutting and return strokes of the tool, as set forth.

In testimony whereof we have signed our names to this specification in the presence of two subscribing witnesses.

JOSEPH HIGGINSON.
HUBERT ARUNDEL.

Witnesses:
HILDA HUGHES,
ARTHUR HUGHES.